(12) United States Patent
Hanlon

(10) Patent No.: US 8,234,974 B2
(45) Date of Patent: Aug. 7, 2012

(54) POMEGRANATE JUICE EXTRACTOR

(76) Inventor: Mark D. Hanlon, Durham, NH (US)

( * ) Notice: Subject to any disclaimer, the term of this patent is extended or adjusted under 35 U.S.C. 154(b) by 626 days.

(21) Appl. No.: 12/313,462

(22) Filed: Nov. 20, 2008

(65) Prior Publication Data

US 2010/0122631 A1    May 20, 2010

(51) Int. Cl.
*A23B 5/00* (2006.01)
(52) U.S. Cl. ............... 99/495; 99/509; D7/381; D7/372; 241/2; 426/599; 426/489
(58) Field of Classification Search ............... D7/665, D7/682, 372–375, 677, 381; 99/506, 502, 99/501, 509–510, 495; 241/169.1, 169.2, 241/9, 300.1, 168, 2; 100/98 R; 426/489, 426/599
See application file for complete search history.

(56) References Cited

U.S. PATENT DOCUMENTS

| | | | | |
|---|---|---|---|---|
| 188,383 A * | 3/1877 | Leslie | ............... | 241/169.2 |
| 207,974 A * | 9/1878 | MoConnell | ............... | 99/340 |
| 385,851 A * | 7/1888 | Easley | ............... | 99/507 |
| 435,962 A | 9/1890 | Bowe | | |
| D27,782 S * | 10/1897 | Dickinson | ............... | D7/677 |
| 719,467 A * | 2/1903 | Holder | ............... | 241/169.2 |
| 1,479,125 A * | 1/1924 | Alger | ............... | 100/299 |
| 1,772,099 A * | 8/1930 | Grunwald | ............... | 100/125 |
| 1,800,653 A * | 4/1931 | Morris | ............... | 241/169.2 |
| 1,840,182 A * | 1/1932 | Bailey | ............... | 100/97 |
| 1,856,954 A * | 5/1932 | Hayward | ............... | 241/169.2 |
| 1,922,773 A * | 8/1933 | Maull | ............... | 100/37 |
| 1,990,779 A * | 2/1935 | Eberts | ............... | 426/489 |
| 1,994,114 A * | 3/1935 | Somers | ............... | 99/502 |
| 2,034,301 A * | 3/1936 | Knapp | ............... | 99/507 |
| 2,160,523 A * | 5/1939 | Scurlock | ............... | 99/507 |
| 2,204,964 A * | 6/1940 | Koch | ............... | 100/213 |
| 2,220,372 A * | 11/1940 | Johnson | ............... | 100/125 |
| 2,589,724 A * | 3/1952 | Miller | ............... | 100/125 |
| 2,677,324 A * | 5/1954 | Cadella | ............... | 100/98 R |
| 3,327,621 A * | 6/1967 | Zysset | ............... | 100/125 |
| 3,554,253 A * | 1/1971 | Vasile | ............... | 99/507 |
| 3,580,314 A | 5/1971 | Besora | | |
| 4,069,752 A * | 1/1978 | Ahner | ............... | 100/112 |
| 4,545,299 A * | 10/1985 | Ahner | ............... | 100/112 |
| 5,331,887 A | 7/1994 | Beck | | |
| 5,537,918 A * | 7/1996 | Patel et al. | ............... | 99/510 |
| 5,570,629 A | 11/1996 | Ruck | | |
| 6,196,122 B1 * | 3/2001 | Lai | ............... | 99/495 |
| D448,629 S * | 10/2001 | Wong | ............... | D7/673 |
| 6,321,644 B1 * | 11/2001 | Kao | ............... | 100/125 |
| D567,034 S | 4/2008 | Carallo | | |
| 7,395,753 B2 * | 7/2008 | Dorion | ............... | 99/495 |

* cited by examiner

*Primary Examiner* — Gene Kim
*Assistant Examiner* — Matthew B Stanczak

(57) ABSTRACT

A manually actuated juicing tool used to insert directly into a pomegranate fruit cut horizontally in half. Once cut horizontally, the pomegranate reveals sections of arils separated by membranes. The tool has a rigid horizontal handle that the user grasps with one hand. A round mid-shaft projects down from the handle a distance sufficient to allow the tool to be projected down to the base of the husk of the fruit while leaving the handle above the husk. At the base of the midshaft are two or more tines projected outwardly and slightly downwardly. The tine at its outward end is convex to match the symmetry of the husk of the fruit. On the bottom of the tine are tiny cutting spikes used to pierce the arils. The tine also contains small vertical extrusion holes to allow juice to flow above the tine while leaving all solids beneath.

2 Claims, 3 Drawing Sheets

POMEGRANATE JUICE EXTRACTOR

CROSS-REFERENCE TO RELATED APPLICATIONS

N/A.

STATEMENT REGARDING FEDERALLY SPONSORED RESEARCH OR DEVELOPMENT

N/A.

REFERENCE TO SEQUENCE LISTING, A TABLE, OR A COMPUTER PROGRAM LISTING DISC

N/A.

BACKGROUND OF THE INVENTION

The pomegranate is a globus fruit surmounted by a crown of calyx lobes. The pomegranate may be as small as an orange or as large as a grapefruit. Pomegranates have a thick though fleshy rind often red in color. Inside the fruit are about 840 tiny juice sacks (arils) each containing a small quantity of sweet red juice. Groups of arils within the core of the fruit are encased by a white membrane similar in texture and sourness to a lemon peel. In its natural state, arils are grouped together and connected by this white membrane forming a pattern within the fruit similar to sections within an orange. The sack of the ariel must be pierced or crushed to remove the juice from its core. The juice from 840 arils amount to approximately 6 fluid ounces. Once collected, the juice may be drunk. The juice of the pomegranate is renowned for its health benefits.

The traditional consumer method of producing juice from this fruit has been to peel the fruit from its crown similar to the way an orange is peeled. Then separate each aril by hand from its membrane and collect the arils to be crushed by a mortar and pestle, or similar device, to produce juice.

Prior art includes the mechanical separation of the arils from the fruit by use of pressurized gas. That method lends itself to the commercial production of pomegranate juice.

Up to the present, no acceptable tool is available for the manual extraction of juice directly from the pomegranate fruit. Prior art for manually actuated tools for the preparation of a citrus juice beverage have been related to orange and grapefruit juice extraction which do not apply to the unique physical characteristics of the pomegranate.

BRIEF SUMMARY OF THE INVENTION

The present invention seeks overcome the time consuming and tedious task of hand removing arils from the hull of the pomegranate and then crushing the arils in a bowl to produce pomegranate juice from each fruit.

There is thus provided in accordance with an embodiment of the present invention a manually actuated tool to allow the user to render the juice from the pomegranate without first removing the arils from the rind of the fruit.

Further, in accordance with the embodiment of the present invention, the user cuts the pomegranate in half revealing the several sections of this fruit. An embodiment of the present invention is then manually lowered down into the fruit with cutting tine(s) lined up to enter a section(s) of the fruit. The user lowers the present invention down into the center of the fruit causing the tine(s) to break the lining of the arils releasing their juice. As the tine(s) bite down into the section of arils, the juice of each aril flows through the tine extrusion holes contained within an embodiment of the present invention. The juice rises above the tine but remains within the husk of the fruit. When all juice has been extruded, the user pours the juice from the husk of the pomegranate into a glass to be consumed. The entire process takes only a few seconds with only the present invention to be cleaned.

BRIEF DESCRIPTION OF THE SEVERAL VIEWS OF THE DRAWING

The present invention will be more fully understood and appreciated from the following brief description taken in conjunction with the drawing in which.

FIGURES

| | |
|---|---|
| 10 | Handle |
| 12 | Mid-Shaft |
| 14 | Tine |
| 16 | Extrusion Holes |
| 18 | Convex blade edge of tine |
| 20 | Curvature of Tine |
| 22 | Cutting Spikes |
| 24 | Double Blade Edge of Tine |

DETAILED DESCRIPTION OF THE INVENTION

Figure 1:
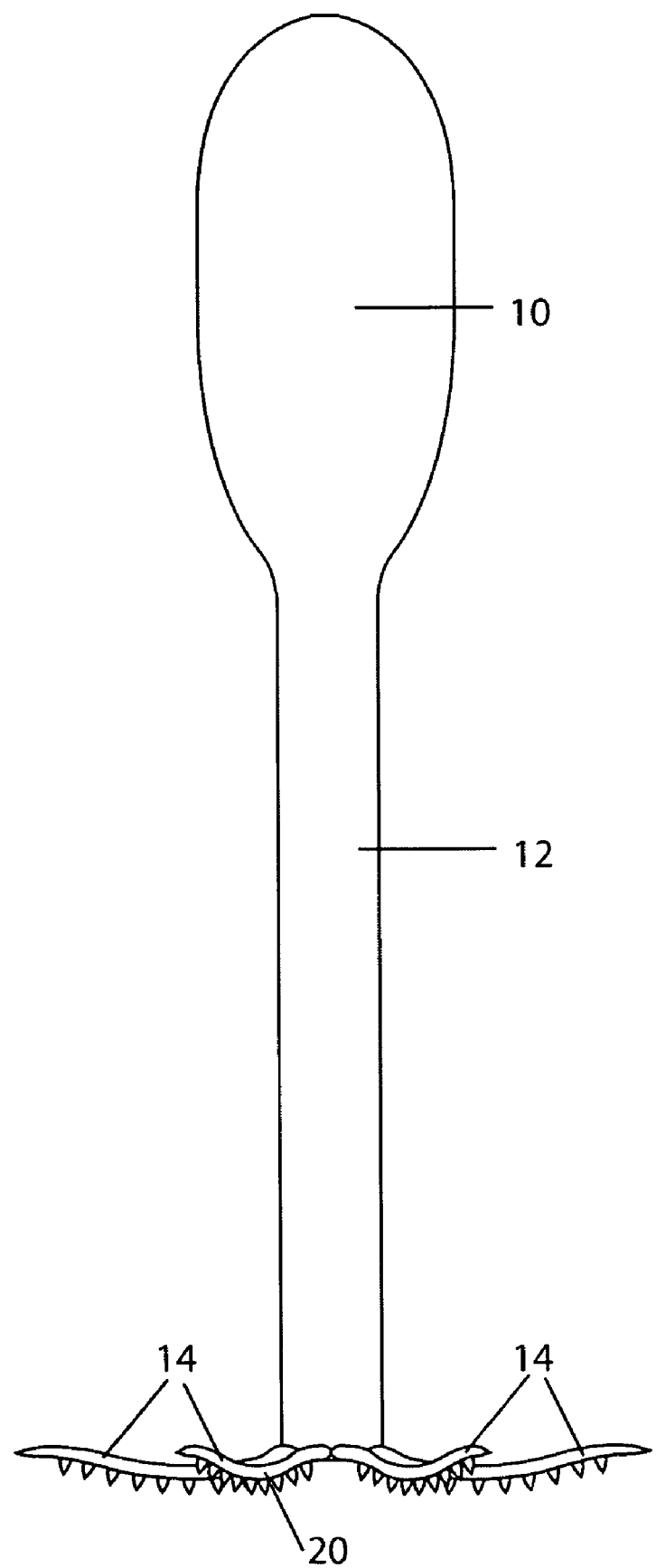
FIG. 1 is a side view illustration of the tool, in accordance with an embodiment of the present invention, showing the handle (10), the mid-shaft (12) and the tines (14).

FIG. 1 presents a side view of an embodiment of the invention wherein the handle (10) at the top of the invention is revealed, allowing the user to grasp the invention and manually insert the invention into the fruit with force. The mid-shaft (12) an extension of the handle projects below the handle all the way to the base of the tool and is substantially round in shape. Projecting outward from the base of the mid-shaft are tines (14) shaped with a gradual curve (20) causing the tine to be vertical to the horizontal mid-shaft and in conformance with the symmetry of the husk of a pomegranate.

Figure 2:
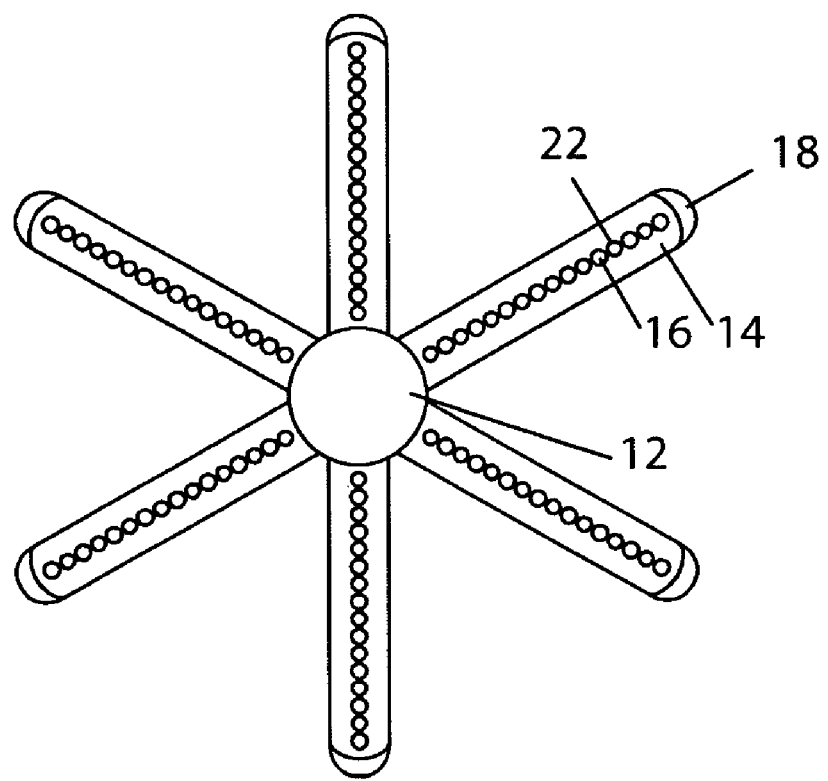
FIG. 2 is a top view illustration of the tool in accordance with an embodiment of the present invention, showing the top of the handle (10) and 6 tines (14), a single row of extrusion holes in each tine (16), and the convex blade edge at the end of each tine (18) to match the symmetry of the husk of the pomegranate.

FIG. 2 presents a top view of an embodiment of the invention wherein there are six tines (16) separated by a space to approximately match the sections of the pomegranate allowing the tines to contact the arils and not the rind or membrane. The width of the tine is approximately that of the width of the section of arils within the fruit. The number of tines and width of tines may vary according to type of pomegranate and size. Also depicted in FIG. 2, are a single row of extrusion holes which permit the juice of the aril to flow through and above the tool leaving solids beneath the tool. Also depicted in FIG. 2, the tip of the tine (18) has a convex shape to match the symmetry of the interior wall of the husk, used to dislodge and burst arils lodged into the rind of the fruit.

Figure 3:
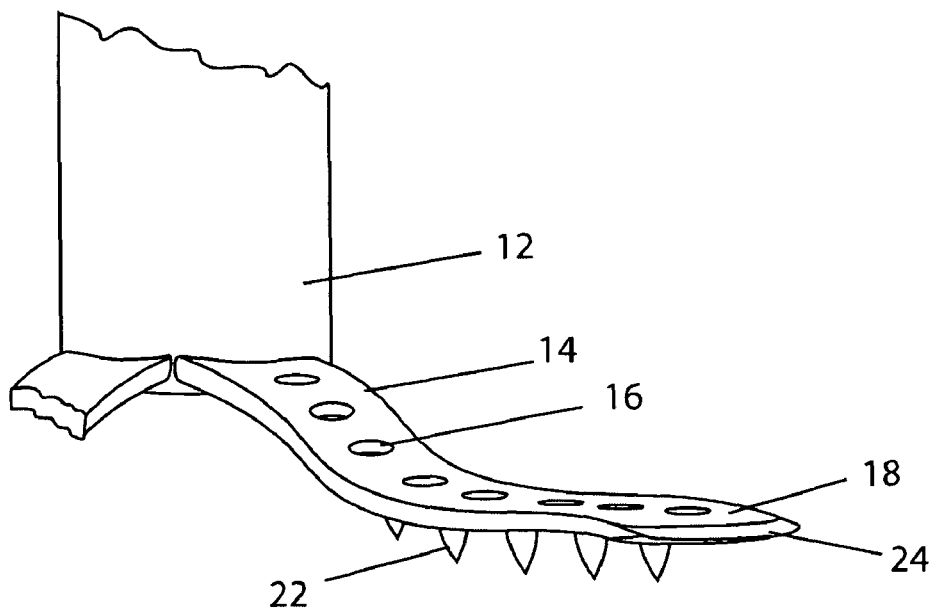
FIG. 3 is an illustration of the tool in accordance with an embodiment, showing a side view of a single tine. Said view shows the gradual curve of the tine (14) as it projects below from the mid-shaft (12) rising to be vertical to the mid-shaft. Also illustrated are the small cutting spikes (22) at the bottom of the tine as well as the double blade edge at the end of the tine (24) that cut into arils lodged into the husk of the fruit.

FIG. 3, presents an embodiment of the invention where a side view of a tine displays small cutting spikes projecting from the base of the Tine (22), these spikes are used for piercing and tearing the arils to release their juice more quickly. FIG. 3., also displays the tine outward end (24) formed into a double edge blade to scrap the wall of the husk to burst arils embedded therein.

In preparation for use of the present invention, the pomegranate is sliced horizontally in half revealing the fruits sections. The present invention is then grasped on the handle by the user and lower into the fruit with the tines lined up with the fruit sections. The user may twist the tool breaking the arils and allowing the tine to be dug further into the fruit as layers of arils are burst. Using this motion the arils are fully burst in a matter of seconds. The tool is then removed from the hull of the fruit with the juice at the surface of the hull. The juice is then poured into a glass for consumption.

I claim:

1. A method for extracting juice from the pomegranate fruit husk comprising:
   a. cutting or slicing the pomegranate husk substantially at the mid-section to reveal several sections of arils within the fruit separated by membranes,
   b. providing an apparatus which contains a rigid vertical handle of approximate size to fit the human hand with a mid-shaft affixed thereto, the mid-shaft of sufficient length to allow the mid-shaft to project into the halved husk of the pomegranate while leaving the handle above and outside the halved husk, the mid-shaft having affixed to its bottom two or more outwardly and slightly downwardly projecting tines, each of which is formed with a permanent gradual curve and convex tip in conformance with the symmetry of the wall of the halved husk of the pomegranate, the tines spaced apart and with a width to approximately match the several sections of the halved husk, the tines further having a row of extrusion holes formed and bottom base surface cutting spikes projecting out along its length,
   c. aligning the tines with the several sections of arils of the halved pomegranate fruit as defined by the membranes,
   d. manually lowering the aligned tines down onto the corresponding sections of the halved husk of the pomegranate fruit between the membranes whereby the bottom base surface cutting spikes contact the arils contained within each corresponding section such that the arils burst causing juice to flow up through the extrusion holes while leaving solids beneath the tines, and
   e. removing the juice from the halved husk.

2. The method of claim 1, wherein the extrusions holes are of a predetermined size and location to permit juice to freely flow through the tines while the seeds of the pomegranate fruit remain under the tines, whereby the juice is separated from the seeds and solids.

* * * * *